United States Patent
Arakawa

(10) Patent No.: US 7,068,664 B2
(45) Date of Patent: Jun. 27, 2006

(54) VOICE INTERCEPTION SYSTEM FOR MOBILE SWITCHING SYSTEM

(75) Inventor: Koji Arakawa, Tokyo (JP)

(73) Assignee: NEC Corporation, Tokyo (JP)

(*) Notice: Subject to any disclaimer, the term of this patent is extended or adjusted under 35 U.S.C. 154(b) by 895 days.

(21) Appl. No.: 09/854,479

(22) Filed: May 15, 2001

(65) Prior Publication Data

US 2001/0043605 A1    Nov. 22, 2001

(30) Foreign Application Priority Data

May 19, 2000    (JP)    ............................. 2000-147347

(51) Int. Cl.
*H04L 12/28*    (2006.01)

(52) U.S. Cl. ............................. 370/395.6; 370/395.61; 370/395.64; 370/474

(58) Field of Classification Search ............ 370/310.1, 370/310.2, 338, 395.43, 395.61, 395.64, 370/399, 474, 395.6
See application file for complete search history.

(56) References Cited

U.S. PATENT DOCUMENTS

| | | | |
|---|---|---|---|
| 5,892,811 | A | 4/1999 | Armbruster et al. |
| 5,913,161 | A | 6/1999 | Ozulkulu et al. |
| 6,034,950 | A * | 3/2000 | Sauer et al. ............ 370/310.2 |
| 6,331,981 | B1 * | 12/2001 | Harth et al. ............ 370/395.1 |
| 6,449,276 | B1 * | 9/2002 | Subbiah et al. ......... 370/395.6 |
| 6,483,838 | B1 * | 11/2002 | Ostman et al. ........ 370/395.31 |
| 6,597,698 | B1 * | 7/2003 | Lundback et al. ......... 370/398 |
| 6,671,367 | B1 * | 12/2003 | Graf et al. ............... 379/229 |
| 6,738,381 | B1 * | 5/2004 | Agnevik et al. ........ 370/395.7 |

FOREIGN PATENT DOCUMENTS

| | | |
|---|---|---|
| JP | 5-284560 | 10/1993 |
| JP | 8-139664 | 5/1996 |
| JP | 9-46288 | 2/1997 |
| JP | 10-4582 | 1/1998 |
| JP | 2000-78552 | 3/2000 |

OTHER PUBLICATIONS

Bandwidth Management for AAL2 Tranffic, by Hiroshi Saito, IEEE Transactions on Vehicular Technology, vol. 49, No. 4, Jul. 2000.*
*3rd Generation Partnership Project; Technical Specification Group Services and System Aspects; 3G Security; Law Interception Architecture and Functions* (3G TS 33.107 version 3.0.0 Release 1999), XP-002267146, dated Dec. 1999, retrieved Jan. 16, 2004.

* cited by examiner

*Primary Examiner*—Andrew C. Lee
(74) *Attorney, Agent, or Firm*—Sughrue Mion, PLLC

(57) ABSTRACT

In a voice interception system, a voice is intercepted by applying a function of a vocoder installed in a voice signal processor to a mobile switching station. This interception implies a conversion between an ATM cell of an AAL2pf, an AAL2, and an AAL1 (PCM), and a conversion between an ATM cell of an AAL2pf and an AAL1 (TFO) in a TFO case. The ATM cell of the AAL2 in the ATM network is picked up from an ATM switch and is intercepted. If a voice TFO CODEC method is used, the above functions are applied to a voice monitor and a voice signal, during a telephone call between mobile stations, is intercepted. It is possible with the disclosed invention to carry out a voice interception only by controlling the ATM switch without individual control of both the ATM switch and an STM switch.

5 Claims, 4 Drawing Sheets

VPI: VIRTUAL PATH IDENTIFIER
VCI: VIRTUAL CHANNEL IDENTIFIER
PT: PAYLOAD TYPE
CLP: CELL LOSS PRIORITY
HEC: HEADER ERROR CONTROL
CPS: COMMON PART SUBLAYER

CID: CHANNEL IDENTIFIER
LI: LENGTH INCLICATOR
UUI: USER-TO-USER INDICATION
INFO: INFORMATION
PAD: PADDING

VOICE INTERCEPTION SYSTEM FOR MOBILE SWITCHING SYSTEM

BACKGROUND OF THE INVENTION

1. Field of the Invention

The present invention relates to a voice interception system in which an ATM (Asynchronous Transfer Mode) switching system is employed to attain a mobile switching station and a voice signal is transmitted between stations under an ATM Adaptation Layer Type 2 (will be abbreviated to "AAL2" hereinafter).

2. Description of the Related Art

Conventionally, such a system is known that an ATM switching system is employed to attain a mobile switching station and a voice signal is transmitted between the stations under the AAL2. Recently, a voice CODEC (COnder-DE-Coder) method referred to as TFO (Tandem Free Operation) applicable to above system is released in accordance with the 3GPP (3rd Generation Partnership Project) recommendation. Thus, the advent of the voice interception system and method corresponding to that voice CODEC method has been expected.

However, conventionally, an ATM switch and an STM (Synchronous Transfer Mode) switch have been separately controlled by control software. For this reason, it is necessary to develop a CODEC peculiar to a voice monitor for converting from an ATM Adaptation Layer Type 1 for Tandem Free Operation (will be abbreviated to "AAL1 (TFO)" hereinafter) to an ATM Adaptation Layer Type 1 for reproducing the voice signal (will be abbreviated to "AAL1 (PCM)" hereinafter). Thus, it is difficult to attain the above-mentioned voice interception system.

As the related art, Japanese Laid Open Patent Application (JP-A-Heisei, 5-284560) discloses "Call Monitor System". This call monitor system is a digital mobile communication system having a switching station for connecting between mobile stations in an original state of a low speed coding signal. In this system, the switching station includes an input signal distributor, a signal converter for converting the low speed coding signal into a PCM signal, and a call monitor. In this system, when monitoring the call between the mobile stations, the low speed coding signal sent from the mobile station is distributed by using the corresponding input signal distributor. A part of the distributed low speed coding signal is sent through a destination switching station to a destination mobile station without conversion. However, the remaining part of the distributed low speed coding signal is converted into the PCM signal by using the corresponding signal converter. Then the PCM signal is sent to the call monitor. The call monitor monitors the telephone call between the mobile stations. Accordingly, it is possible to monitor the call carried out by the low speed coding signal.

Japanese Laid Open Patent Application (JP-A-Heisei, 8-139664) discloses "Digital Signal Call Monitor". In this digital signal call monitor, when a signal identification portion identifies a monitor signal as a non-voice mode monitor signal, converts a voice message stored in a substitution data portion into a coding voice signal, and outputs it. This outputted signal is supplied through an input switching portion and a coding mode selection portion to a decoder. The decoder converts the supplied signal into a PCM coding voice signal. Moreover, a PCM monitor circuit converts the PCM coding voice signal into an analog voice signal, and outputs it. Thus, the voice message is outputted when monitoring the non-voice mode signal. Hence, it can be evidently known that the non-voice mode signal is being monitored without any uncomfortable noise and silent tone caused by a data signal.

Japanese Laid Open Patent Application (JP-A-Heisei, 9-46288) discloses "Monitoring Method For Mobile Communication and System For The Same". This system includes; input means which inputs a signal of a monitor channel specified by a subscriber number or a circuit number; judgment means which judges which of coding processes is carried out in accordance with the signal inputted by this input unit; and a voice signal converting means which carries out a conversion control of a voice signal in accordance with the judged result. Thus, a mobile communication system can continuously monitor communication information without initializing a channel monitor even if a coding manner is changed.

Japanese Laid Open Patent Application (JP-A-Heisei, 10-4582) discloses "Digital Signal Call Monitor". In this digital signal call monitor, a high multiplex signal on a highway between a voice processor and a radio base station is inputted to a code conversion portion through an input terminal. The code conversion portion is provided with a time slot selection portion, a channel selection portion and a format conversion portion. A channel and a time slot to be monitored, which are specified by a channel designation portion, are selected from the above signal. The format conversion portion converts the high multiplex signal into a signal having a format on a side of a switching network of 64 Kbps. An output of the code conversion portion is connected to the input terminal for inputting a highway signal between the conventional voice processor and a switching device. Thus, in the call monitor in a digital mobile communication system represented by a digital car telephone, it is possible to carry out the voice monitor of the high multiplex signal on the highway between the voice processor and the radio base station.

Moreover, Japanese Laid Open Patent Application (JP-A-2000-78552) discloses "Television Conference System". In this television conference system, a general-purpose personal computer is used as a television conference terminal. A decoder employs an MPEG-2 method and an encoder of a video encode server employs the MPEG-2 method. A number m of the encoders is smaller than the number n of decoders of the conference terminal. Also, they are optimized for traffic in a meeting exhibition. A multi-point conference server provides a multi-point conference service through ATM-SW to the respective terminals. The video-on demand server provides a video-on demand service to the respective terminals. Thus, it is possible to improve the initial economics when the system including the conference terminals is designed, and also possible to drop a running cost.

SUMMARY OF THE INVENTION

An object of the present invention is to provide a voice interception system that can carry out a voice interception by controlling only an ATM switch, rather than separately controlling both the ATM switch and an STM switch.

For achieving the above-mentioned object, a voice interception system according to the present invention is a system in which an ATM cell of an AAL2 is transferred between stations. Referring to FIG. 1, this voice interception system comprises a base station controller 1, a mobile switching station 2, a voice signal processor 3-1 and a third party call apparatus 7.

The mobile switching station includes ATM cell assembler/de-assembler units 2-1 and 2-3, a voice monitor (Vocoder) 2-5, and an ATM cell multiplexer/demultiplexer 2-4. The Vocoder 2-5 is shown receiving an ATM cell of an ATM Adaptive Layer One Tandem Free Operation (AAL1 (TFO)), and converting the AAL1 (TFO) to an ATM cell of a modification of the ATM Adaptive Layer Type 2 (AAL2pf). The Vocoder 2-5 outputs modified ATM Adaptive Layer 2 (AAL2pf) to ATM cell multiplexer/demultiplexer 2-4. And lastly, upon return of the AAL2pf signal from ATM cell multiplexer/demultiplexer 2-4, the Vocoder 2-5 converts AAL2pf to AAL1 (PCM), Pure Code Modulation. The ATM cell multiplexer/demultiplexer 2-4 has a function of returning an ATM cell of AAL2pf sent by the voice monitor 2-5 back to the voice monitor. The ATM cell of the AAL2pf is equal to the ATM cell of AAL2, except that the ATM cell of the AAL2pf accommodates one piece of user data therein and does not have a start field.

Still referring to FIG. 1, the voice signal processor 3-1 includes a vocoder 9-1 having a function of carrying out a mutual conversion between the ATM cell of the AAL2pf and the ATM cell of the AAL1 (TFO) and a mutual conversion between the ATM cell of the AAL2pf and the ATM cell of the AAL1 (TFO) in the TFO case.

The third party call apparatus 7 is provided on a side of an STM network in order to finally hear as a tone the content after the conversion into the ATM cell of the AAL1 (PCM) in the voice monitor 2-5.

Further, an ATM switch in the mobile switching system forms a multitude of paths, designated by encircled numerals 1, 2, 3, 4 and 5, respectively in FIG. 1. The first path ① is set when a telephone call is carried out between stations. The second path ② (Point-to-Multipoint path) is set when each voice signal is drawn into the voice monitor 2-5 in order to intercept the telephone call. The third path ③ (returning path) is set, in the TFO case, when the ATM cell of AAL2pf, converted from the ATM cell of the AAL1 (TFO), is sent to the ATM cell multiplexer/demultiplexer, then returned back to the voice monitor. The AAL2pf is converted to the ATM cell of the AAL1 (PCM). The fourth path ④ is set between the voice monitor and the third party call apparatus. The fifth path ⑤ is set when the voice is actually intercepted after the third party call apparatus synthesizes the voice signal between the stations.

The voice intercept system according to the present invention may be constituted such that when a path connection around the voice monitor to carry out the conversion between the ATM cells of the AAL1 (TFO), the AAL2pf, and the AAL1 (PCM) is initially set, all the other paths, except the second path, are fixedly connected in an initial setting stage without any intervention of a software control for a call process.

Also, the voice intercept system according to the present invention may be constituted such that a voice can be intercepted only by setting a half fixed path for the terminal on the side of the STM network, connecting the STM network and the ATM network to each other through a fixed path, and carrying out the call process based on software only for the path connection process of the ATM switch to thereby control the ATM switch 2-2 as the control of the voice intercept system from the software.

Also, referring to FIG. 2, the voice intercept system according to the present invention may be constituted such that the voice signal of the ATM cell of the AAL2 is converted into the ATM cell of the AAL2pf in the mobile switching station 2, sent to the ATM switch 2-2, to the Vocoder, voice monitor 2-5, where the voice monitor converts the voice signal AAL2pf, captured by setting the second path, into the ATM cell of AAL1 (PCM). The AAL1 (PCM) can be reproduced as a voice, and then the converted voice signal is reproduced as the voice in the STM network.

Also, the voice intercept system according to the present invention may be constituted such that the voice signal captured by setting the second path is the ATM cell of the AAL1 (TFO) in the TFO case, and the ATM cell of the AAL2pf in the non-TFO case.

Also, the voice intercept system according to the present invention may be constituted to have the following construction in the non-TFO case.

(1) The ATM cell assembler/de-assembler unit converts the ATM cell of the AAL2 sent from the base station controller into the ATM cell of the AAL2pf.

(2) The ATM cell of the AAL2pf is not passed through a multi-media signal processor corresponding to the voice signal processor.

(3) Since the second path is set in the ATM switch, the converted ATM cell of the AAL2pf is divided into two directions so that one is used to keep the normal communication between the mobile stations, and the other is used to draw into the voice monitor.

(4) The ATM cell of the AAL2pf drawn into the voice monitor is converted into the ATM cell of the AAL1 (PCM).

(5) The voice signal, which is passed through the voice monitor and converted into the ATM cell of the AAL1 (PCM), is sent through an ATM/STM converter to the STM network.

(6) In the STM network, the third party call apparatus mixes the respective voice signal, and the respective voice signal are intercepted as a conversation signal by the voice interception receiver.

Moreover, the voice intercept system according to the present invention may be constituted to have the following construction in the TFO case.

(11) The ATM cell assembler/de-assembler unit converts the voice signal included in the ATM cell of the AAL2 sent by the base station controller into the ATM cell of the AAL2pf.

(12) The converted ATM cell of the AAL2pf is once converted into the ATM cell of the AAL1 (TFO) through the vocoders.

(13) In the mobile switching station, the ATM switch sets the second path, and the voice monitor draws the ATM cell of the AAL1 (TFO) therein.

(14) The voice monitor converts the drawn ATM cell of the AAL1 (TFO) into the ATM cell of the AAL2pf.

(15) The converted ATM cell of the AAL2pf is once sent to the ATM cell multiplexer/demultiplexer.

(16) A return path is set by a switch within the ATM cell multiplexer/demultiplexer. So, again, the ATM cell of the AAL2pf is drawn into the voice monitor.

(17) The drawn ATM cell of the AAL2pf is converted into the ATM cell of the AAL1 (PCM), and the ATM cell of the AAL1 (PCM) is intercepted by a dedicated receiver, in the STM network.

DESCRIPTION OF THE PREFERRED EMBODIMENTS

Figure 3:
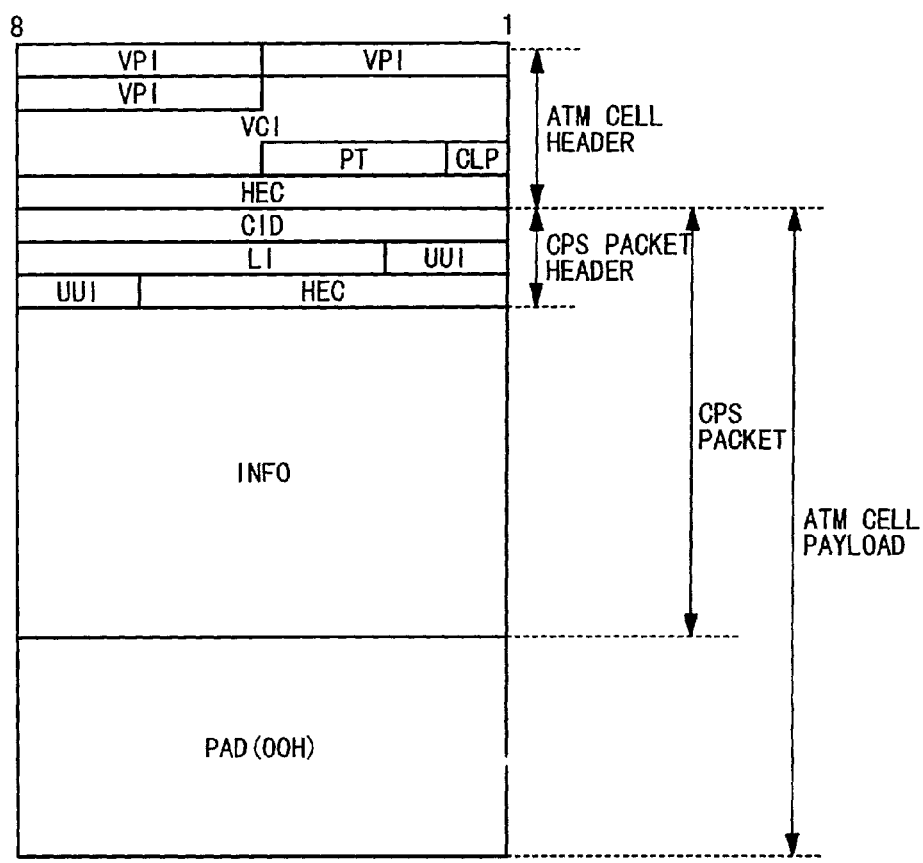
FIG. 3 is a view showing a configuration of an ATM cell format of an AAL2pf.
Figure 4:
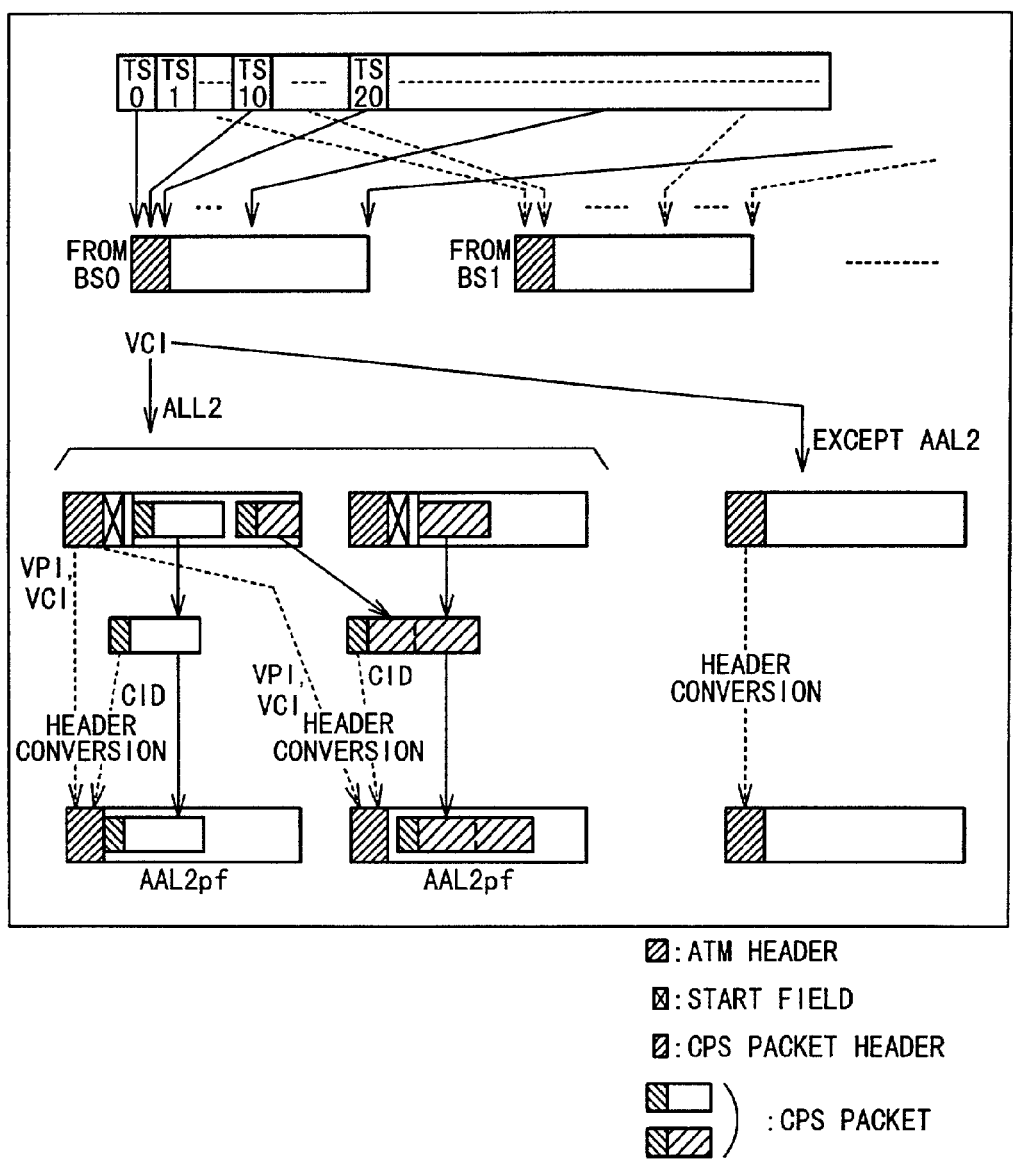
FIG. 4 is a view showing a flow of a decomposition process from an ATM cell of an AAL2 and a conversion into an ATM cell of AAL2pf.

First, various terms to be used in the following description are explained prior to the explanation of preferred embodiments. An AAL2pf implies the improved version of a later-described AAL2 that is newly developed by this applicant, associated with the development of a W-CDMA (Wideband-Code Division Multiple Access) system. This differs from the later-described AAL2 in that one piece of user data is accommodated for one ATM cell and that there is no start field. It should be noted that the ATM cell format of the AAL2 is described in an ITU-recommendation I363.2. FIG. 3 shows a concrete configuration of an ATM cell format of the AAL2pf. Also, FIG. 4 shows a flow of a de-composition process from an ATM cell of an AAL2.

The AAL1 is a layer for treating an ATM cell in accordance with an ITU-recommendation (I363.1). The AAL2 is a layer for treating an ATM cell in accordance with an ITU-recommendation (I363.2). The TFO (Tandem Free Operation) is a voice CODEC method in order to avoid the deterioration in a voice quality caused by a double coding process at a time of a communication between mobile stations. Specifically, for keeping the voice quality, a transmission source vocoder converts the format of encoded coding data into such a format that a relay transmission in an STM network is considered, and then transmits to a transmission destination vocoder.

The feature of the present invention firstly lies in the mechanism that, in a mobile communication network, a function of a vocoder installed in a multi-media signal processor such as a voice signal processor is applied to a mobile switching station to enable a voice to be intercepted. The above-mentioned function implies the execution of the conversion between the ATM cells of the AAL2pf, the AAL2, and the AAL1 (PCM) and also the conversion between the ATM cell of the AAL2pf and the AAL1 (TFO) in the TFO case.

Another feature lies in the mechanism that the ATM cell of the AAL2 in the ATM network is picked up from the ATM switch to enable a voice to be intercepted. Especially, in the case of the usage of a voice CODEC method referred to as TFO, the above-mentioned function is applied to a voice monitor to enable a voice during a telephone call between the mobile stations to be intercepted.

Figure 1:
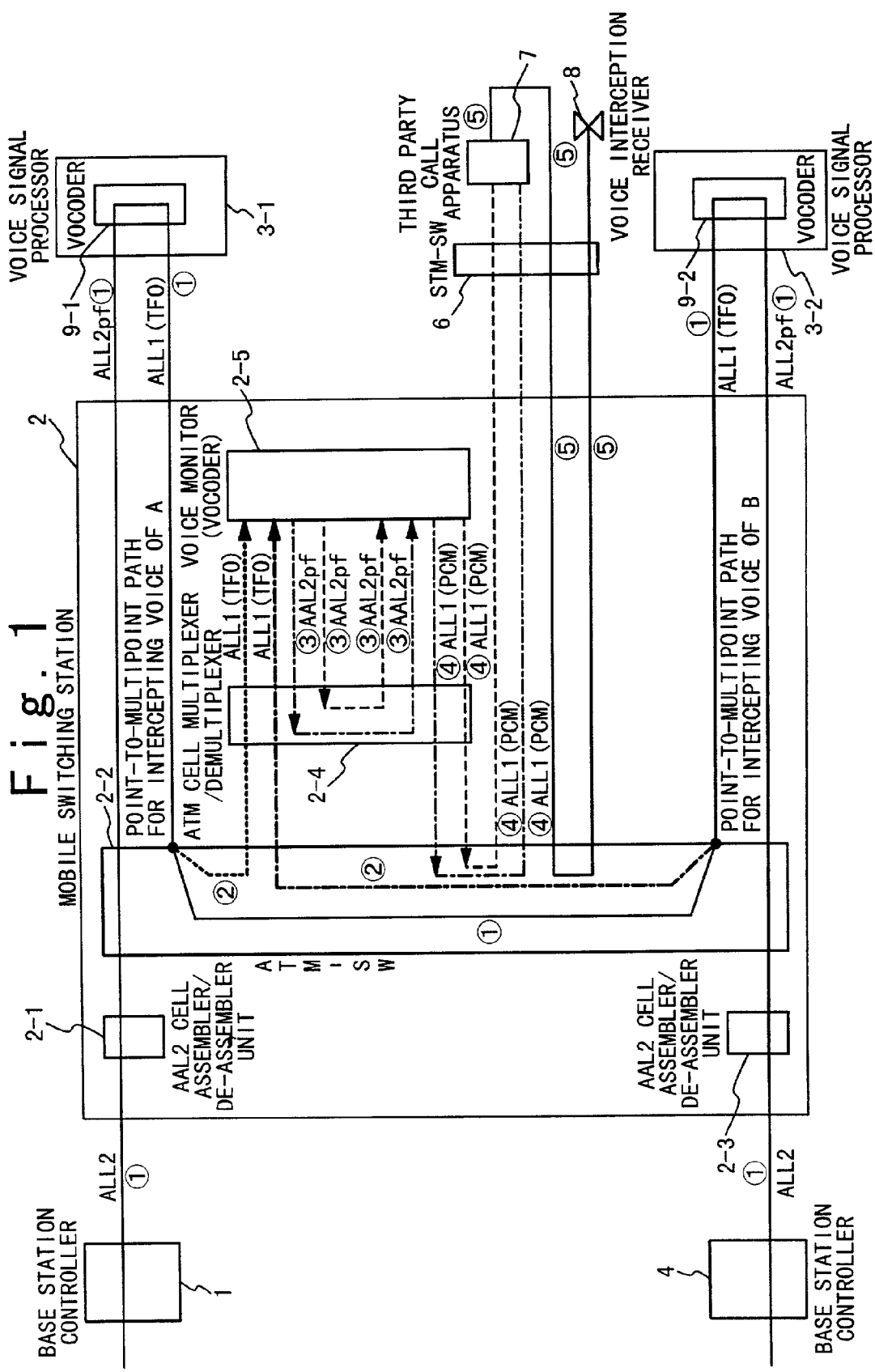
FIG. 1 is a view showing a path connection configuration in a TFO case in the voice interception system of the present invention.
Figure 2:
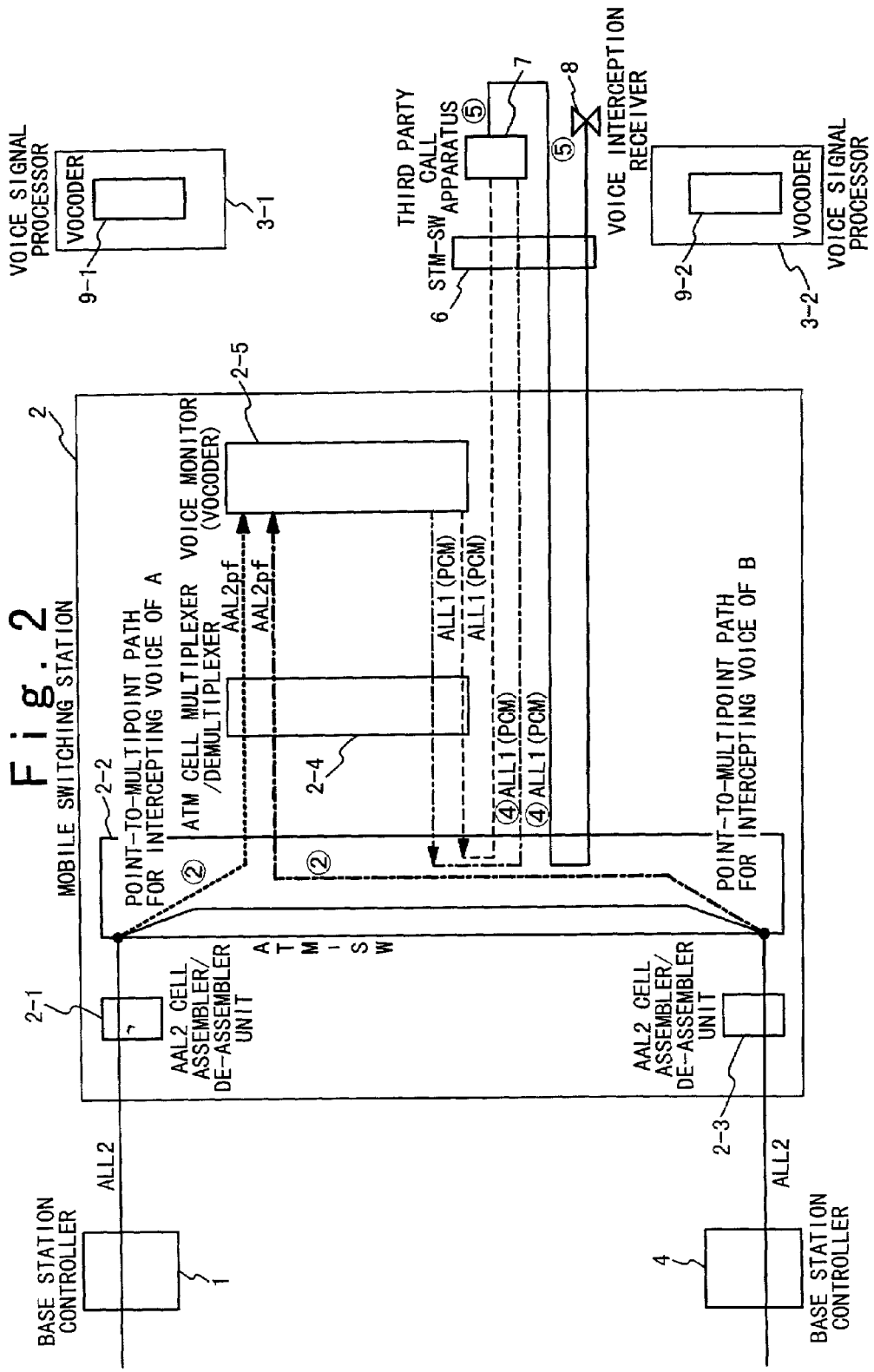
FIG. 2 is a view showing a path connection configuration in a non-TFO case in this voice interception system of the present invention.

Still another feature lies in the mechanism that when a mobile switching station is initially set, a path connection (shown by a dashed line/an alternate long and short dashed line except a solid line in FIGS. 1 and 2), for the sake of the conversion from the ATM cell of the AAL1 (TFO) to the ATM cell of the AAL2pf and the conversion from the ATM cell of the AAL2pf to the ATM cell of the AAL1 (PCM), around a voice monitor in a mobile switching station is performed. That is, all paths except a point-to-multipoint path (shown by a bold dashed line/an alternate long and short dashed line in FIGS. 1 and 2) in an ATM-SW are fixedly connected (Permanent Virtual Channel (PVC) connection) at an initial setting state without any intervention of software control for a call process.

Moreover, another feature lies in the mechanism that, in this voice interception system, since the STM network is connected through the fixed path to the ATM network, a voice can be intercepted only controlling the ATM-SW by the software without separately controlling the ATM-SW and the STM-SW. In other words, the STM-SW is at a state at which it is apparently fastened to the ATM-SW.

Now, the embodiments of the present invention will be explained below in detail with reference to the attached drawings. First, as to telephone call methods, there are a case of a communication between a mobile station and a land station (Mobile-to-Land communication) and a case of a communication between a mobile station and a mobile station (Mobile-to-Mobile communication). In this specification, a voice interception method in the case of the communication between mobile stations is explained. In the case of communication between mobile stations, there are two operations, such as the TFO and the non-TFO, used as the method of CODEC (coding process) of voice signal. The respective operations will be described, herein. Also, there are three forms of interception. Now, let us suppose that A and B are calling to each other by using the communication between the mobile stations. The three forms of interception include a first form wherein a voice of only A is intercepted, a second form, wherein a voice of only B is intercepted, and a third form, wherein both voices of A and B are intercepted. The voice interception methods of the present invention to be described later attain those three forms of interception.

A configuration of this voice interception system will be described below with reference to FIGS. 1 and 2.

The voice interception system according to the present invention is composed of base station controllers 1 and 4, a mobile switching station 2, voice signal processors 3-1 and 3-2, STM-SW 6, a third party call apparatus 7 and voice interception receiver 8.

The mobile switching station 2 includes AAL2 cell assembler/de-assembler units 2-1 and 2-3, an ATM switch (ATM-SW) 2-2, an ATM cell multiplexer/demultiplexer 2-4 and a voice monitor 2-5. The ATM cell multiplexer/demultiplexer 2-4 returns back, in the TFO case, an ATM cell of the AAL2pf sent from the voice monitor 2-5 to the voice monitor 2-5. The voice monitor 2-5 has the same function as the vocoders 9-1 and 9-2. That is, the voice monitor 2-5 converts the ATM cell of the AAL1 (TFO) into the ATM cell of the AAL1 (PCM).

The voice signal processors 3-1 and 3-2 includes vocoders 9-1 and 9-2, respectively.

The STM switch 6, a third party call apparatus 7, a voice interception receiver 8 and the like arranged on the existing STM network side are used to finally hear the voice signal included in the ATM cell of the AAL1 (PCM) from the voice monitor 2-5 as a tone after.

In the mobile switching station 2, a path ① shown in FIGS. 1 and 2 by a solid line is set when A and B give a telephone call to each other. A point-to-multipoint path ② shown in FIGS. 1 and 2 is set to draw respective voice signal into a voice monitor 2-5 in order to intercept the telephone call. A return path ③ shown in FIGS. 1 and 2 is set to convert from the ATM cell of the AAL2pf to the ATM cell of the AAL1 (PCM). In the TFO case, the voice monitor 2-5 converts the ATM cell of AAL1 (TFO) to the ATM cell of AAL2pf and send it to the AAL2 cell multiplexer/demultiplexer 2-4. Then, the AAL2 cell multiplexer/demultiplexer 2-4 returns back the ATM cell of the AAL2pf to the voice monitor 2-5. Also, a path ④ shown in FIGS. 1 and 2 is set between the third party call apparatus 7 in an STM network and the voice monitor 2-5. Further, a path ⑤ shown in FIGS. 1 and 2 is set through which the voice signal of A and B synthesized by the third party call apparatus 7 is sent to the voice interception receiver 8 for actually hearing the voice.

In the mobile switching station 2, the voice signal included in the ATM cell of the AAL2 is converted into the ATM cell of the AAL2pf to send to the ATM switch 2-2. The voice monitor 2-5 converts the voice signal included in the ATM cell (the ATM cell of the AAL1 (TFO) in the TFO case, and the ATM cell of the AAL2pf in the non-TFO case) captured by setting the point-to-multipoint path into the ATM cell of the AAL1 (PCM) that can be reproduced as the voice. The voice signal included in the ATM cell of the AAL1 (PCM) is reproduced as the voice in the STM network.

The operations in this voice interception system will be described below with reference to FIGS. 1 and 2. As mentioned above, in this voice interception, it is assumed that A and B carry out the Mobile-to-Mobile communication with each other, as the premise condition. Also, in this embodiment of the present invention, not only the path connection for the sake of the conversion of AAL1 (TFO)→ AAL2pf→ AAL1 (PCM) but also a series of path connections around the voice monitor 2-5 is carried out in a hardware manner at the initially setting stage of the mobile switching station 2.

At first, the base station controller 1 sends a voice signal of A from the ATM network (not shown) to the AAL2 cell assembler/de-assembler unit 2-1 in the mobile switching station 2 as an ATM cell of the AAL2. The AAL2 cell assembler/de-assembler unit 2-1 de-assembles and converts the ATM cell of the AAL2 into an ATM cell of the AAL2pf. Similarly, the base station controller 4 sends a voice signal of B from the ATM network (not shown) to the AAL2 cell assembler/de-assembler unit 2-3 in the mobile switching station 2 as an ATM cell of AAL2. The AAL2 cell assembler/de-assembler unit 2-3 de-assembles and converts the ATM cell of the AAL2 into an ATM cell of the AAL2pf. The operation of the voice interception executed after that is different depending on the above-mentioned TFO case and non-TFO case.

The operations of the interception system in the non-TFO case will be described below in operations (1) to (7) with reference to FIG. 2.

(1) The ATM cell of the AAL2 from the base station controller 1 is sent to the AAL2 cell assembler/de-assembler unit 2-1 in the mobile switching station 2. The AAL2 cell assembler/de-assembler unit 2-1 coverts the received ATM cell of the AAL2 into an ATM cell of the AAL2pf. Similarly, the ATM cell of the AAL2 from the base station controller 4 is sent to the AAL2 cell assembler/de-assembler unit 2-3 in the mobile switching station 2. The AAL2 cell assembler/de-assembler unit 2-3 coverts the received ATM cell of the AAL2 into an ATM cell of the AAL2pf.

(2) The received data AAL2 does not pass through a multi-media signal processor, i.e., the voice signal processor 3-1 or 3-2. In short, it is CODEC Bypass.

(3) Since the point-to-multipoint path is set in the ATM switch 2-2, the converted ATM cell of the AAL2pf is divided into two directions. One is used to keep the normal communication between the mobile stations, and the other is used to draw into the voice monitor 2-5 (in FIG. 2, ② shown by a bold dashed line, and ② shown by a bold alternate long and short dashed line).

(4) The ATM cell the AAL2pf drawn into the voice monitor 2-5 is converted into the AAL1 (PCM).

(5) The voice signal, which is passed through the voice monitor 2-5 and converted into the ATM cell of the AAL1 (PCM), is sent through the STM switch 6 (the ATM/STM converter) to the STM network.

(6) In the STM network, the third party call apparatus 7 mixes the voice signal of A and B. Thus, the respective voice signal of A and B can be considered as the conversation signal.

(7) The mixed voice signal can be intercepted by the voice interception receiver 8.

The above-mentioned configuration can attain the voice interception in the case of the non-TFO. This is applied to the communication between the mobile stations in the same business party.

The operations of the interception system in the TFO case will be described below in operation (11) to (18) with reference to FIG. 1.

(11) The AAL2 cell assembler/de-assembler unit 2-1 in the mobile switching station 2 converts the voice signal included in the ATM cell of the AAL2 received from the base station controller 1 into the ATM cell of the AAL2pf. Also, the AAL2 cell assembler/de-assembler unit 2-3 in the mobile switching station 2 converts the voice signal included in the ATM cell of the AAL2 received from the base station controller 4 into the ATM cell of the AAL2pf.

(12) The ATM cell of the AAL2pf converted at the AAL2 cell assembler/de-assembler unit 2-1 is once passed through the vocoder 9-1 in the voice signal processor 3-1. Also, the ATM cell of the AAL2pf converted at the AAL2 cell assembler/de-assembler unit 2-3 is once passed through the vocoder 9-2 in the voice signal processor 3-2. However, here is a point largely different from that of the non-TFO case. The AAL2pf is converted into the form of the AAL1 (TFO). Moreover, even if the ATM cell is sent to the STM network while kept in the form of the AAL1 (TFO), it can not be reproduced as the voice.

(13) In view of the (12) circumstance, it is necessary to again convert the ATM cell of the AAL1 (TFO) into the cell of the AAL1 (PCM) that can be reproduced as the voice. So, similarly to the above-mentioned item (3), in the mobile switching station 2, the ATM switch 2-2 is used to set the point-to-multipoint path to draw the ATM cell of the AAL1 (TFO) into the voice monitor (in FIG. 1, ② shown by a bold dashed line, and shown by a bold alternate long and short dashed line).

(14) The voice monitor 2-5 converts the drawn ATM cell of the AAL1 (TFO) into the ATM cell of the AAL2pf.

(15) The ATM cell converted into the AAL2pf is once sent to the ATM cell multiplexer/demultiplexer 2-4.

(16) A return path is set by a switch (not shown) within the ATM cell multiplexer/demultiplexer 2-4. So, again, the ATM cell of the AAL2pf is drawn into the voice monitor 2-5.

(17) The ATM cell of the AAL2pf drawn into the voice monitor 2-5 is converted into the AAL1 (PCM).

Accordingly, the operations similar to those of the above-mentioned items (5) to (7) enable the interception in the dedicated voice interception receiver 8, in the STM network.

The above-mentioned configuration can attain the voice interception in the TFO case. This is applied to the communication between the mobile stations in another business party. The above-mentioned explanation describes the respective voice interception methods in the TFO/non-TFO cases. Also, the above-mentioned item (14) in the interception method in the non-TFO case and the above-mentioned items (24) to (27) in the interception method in the TFO case are the voice interception method, and they are the CODEC peculiar to the voice monitor.

According to the present invention, it is not necessary to develop the CODEC peculiar to the voice monitor for carrying out the conversion from the AAL1 (TFO) to the AAL1 (PCM).

Also, according to the present invention, at the initially setting stage of the exchange, the STM network is connected through the fixed path to the ATM network. Thus, with regard to this voice interception method, as the control from the software, it is possible to carry out the voice interception only by controlling the ATM-SW without any individual control of both the ATM-SW and the STM-SW.

What is claimed is:

1. A voice interception system for intercepting a voice signal included in an Asynchronous Transfer Mode (hereinafter referred to as "ATM") cell transferred in an ATM Adaptation Layer type 2 (hereinafter referred to as "AAL2") of an ATM network, comprising:

base station controllers;

a mobile switching station comprising:

a plurality of ATM cell assembler/de-assembler units which convert the ATM cell of the AAL2 received from the ATM network through a base station controller to an ATM cell of a modification of the ATM Adaptation Layer type 2 (hereinafter referred to as "AAL2pf"), and convert the ATM cell of the AAL2pf, received from another ATM cell assembler/de-assembler unit via an ATM switch, to the ATM cell of the AAL2 to send to said base station controller, wherein the ATM cell of the AAL2pf is a modified ATM cell of the AAL2, wherein the ATM cell of the AAL2pf accommodates one piece of user data therein and does not have a start field;

a voice monitor which generates an ATM cell of an ATM Adaptation Layer type 1 for reproducing a voice signal (hereinafter referred to as "AAL1 (PCM)") based on the ATM cell of the AAL2pf from said plurality of ATM cell assembler/de-assembler units;

an ATM switch; and a third party call apparatus which converts the ATM cell of the AAL1 (PCM) sent from said voice monitor through a Synchronous Transfer Mode (hereinafter referred to as "STM") network to the voice signal, wherein said ATM switch sets a first path in which the ATM cell of the AAL2pf from one of said plurality of ATM cell assembler/de-assembler units is sent to another one of said plurality of the ATM cell assembler/de-assembler units, and sets a second path in which the ATM cell of the AAL2pf passing through the first path is drawn into said voice monitor, and sets a third path in which the ATM cell of the AAL1 (PCM) from said voice monitor is sent to said the third party call apparatus through said STM network; and a vocoder for carrying out a mutual conversion between the ATM cell of the AAL2pf and an ATM cell of an Adaptation Layer type 1 for the Tandem Free Operation (hereinafter referred to as "AAL1 (TFO)"), wherein said voice monitor converts the ATM cell of the AAL2pf from said plurality of the ATM cell assembler/de-assembler units to the ATM cell of the AAL1 (PCM) in a non-Tandem Free Operation case, and converts the ATM cell of the AAL1 (TFO) from said vocoder to the ATM cell of the AAL1 (PCM) in a Tandem Free Operation case.

2. The voice interception system according to claim 1, further comprising:

an ATM cell multiplexer/demultiplexer which receives the ATM cell of the AAL2pf from said voice monitor, and returns the ATM cell of the AAL2pf from said voice monitor back to said voice monitor, creating a fourth path in the voice interception system.

3. The voice interception system according to claim 2, further comprising:

a voice interception receiver which intercepts a voice, wherein said ATM switch sets a fifth path in which the voice signal is sent from said third party call apparatus to said voice interception receiver.

4. The voice interception system according to claim 3, wherein all the other paths except the second path are fixedly set at an initially setting stage without intervention of a software control for a call process.

5. The voice interception system according to claim 4, wherein said STM network and said ATM network are connected to ,each other through the fixedly set paths, and the call process to intercept the voice is carried out based only on a path connection process of said ATM switch.

* * * * *